(No Model.)
N. F. BONIFACE.
CHILD'S TRAVELING TOILET.
No. 579,337.                        Patented Mar. 23, 1897.
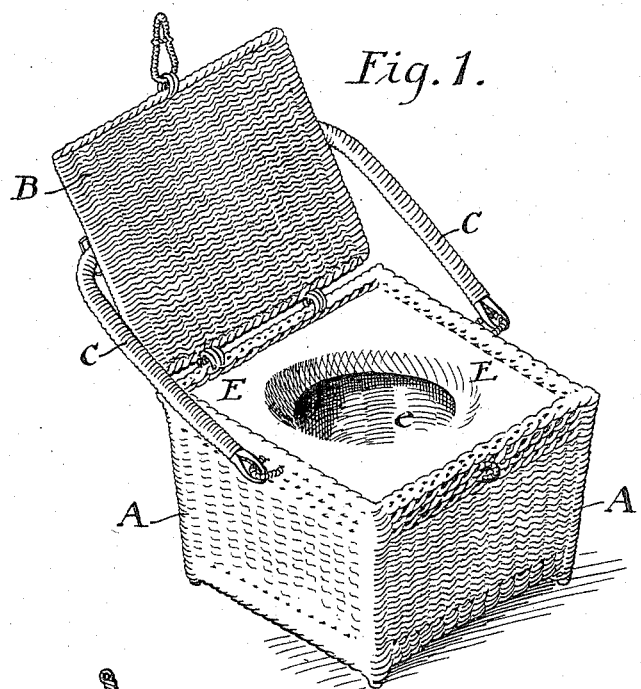
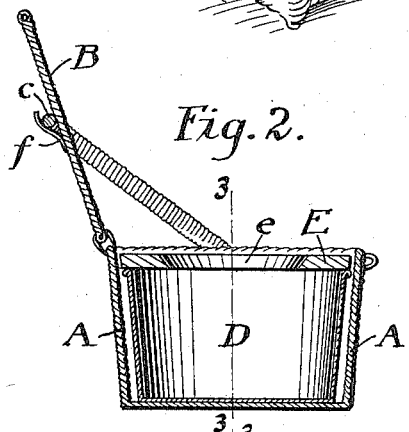
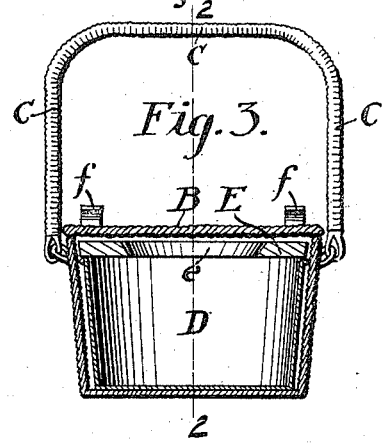
WITNESSES.                                    INVENTOR.

UNITED STATES PATENT OFFICE.

NONNA FERNER BONIFACE, OF BOSTON, MASSACHUSETTS.

CHILD'S TRAVELING TOILET.

SPECIFICATION forming part of Letters Patent No. 579,337, dated March 23, 1897.

Application filed February 10, 1896. Serial No. 578,814. (No model.)

*To all whom it may concern:*

Be it known that I, NONNA FERNER BONIFACE, a citizen of the United States, and a resident of Boston, in the county of Suffolk and State of Massachusetts, have invented a new and useful Improvement in Children's Traveling Toilets, of which the following, taken in connection with the accompanying drawings, is a specification.

The object of my invention is to produce a child's traveling toilet that can be used in railroad-cars, steamboats, and hotels, and which will have such an appearance that it will not indicate the object for which it is used.

My invention relates to toilet devices; and it consists in an apparatus of that character which is suitable for use for children while traveling, and is so constructed and arranged as to be light, portable, and inoffensive and to effect concealment of the object for which it is to be used.

I am aware that various devices have been formerly used which so far resemble my invention that they comprise a receptacle with a lid and handle, an inner receptacle contained therein, and a seat with a hole in it. Such a device is shown in the patent to Saunders, No. 459,148, dated September 8, 1891. I am also aware that it is not broadly new to so construct devices of this character as to effect concealment of the object for which they are to be used. This has been effected by Imse, Patent No. 245,833, dated August 16, 1881; but I am not aware that any of these devices or any devices hitherto known are suitable for use in traveling, are in any way portable or suitable to carry about, or are constructed of open-work material.

In the drawings attached to this specification, Figure 1 is a view of my invention in perspective. Fig. 2 is an elevation section on the line 2 2 of Fig. 3. Fig. 3 is an elevation section on the line 3 3 of Fig. 2.

Like letters refer to like parts in the various figures of the drawings.

A is the outer receptacle, which I prefer to construct like an ordinary basket, as shown, of wicker-work or other suitable material.

B is the cover, and C the handle.

D is an inner receptacle or pan, preferably of metal, resting on the bottom of the basket.

E is the seat, with an opening $e$, preferably resting on the pan D. I prefer to make the seat E of wood.

Cleats $ff$ are attached to the cover B in such a way that when the cover is raised the cleats will engage the handle, so that the cover will form a back for the seat when the article is in use.

It will be seen that I thus provide an article which is light and portable, very simple in construction and easy to clean, and of such appearance that it can be carried in public without attracting attention.

What I claim is—

1. As an article of manufacture, a child's toilet consisting of a receptacle having a lid and handle, a removable pan, and a detachable seat supported by the pan having a hole therein, the receptacle being formed of open-work material to prevent the accumulation of odors, and the whole device being so constructed and arranged as to effect concealment of the object for which it is used, substantially as described.

2. As an article of manufacture, a child's toilet consisting of an open-work receptacle formed to resemble an ordinary basket, having a lid and a handle, a cleat secured to the lid to engage the handle when the article is in use, whereby the lid forms a back for the seat, a removable pan, and a detachable seat supported by the pan, the whole being so constructed and arranged as to effect concealment of the object for which it is used, substantially as described.

In testimony whereof I have signed my name to this specification, in the presence of two subscribing witnesses, on this 30th day of January, A. D. 1896.

NONNA FERNER BONIFACE.

Witnesses:
ALICE C. BRADBURY,
WILLIAM E. FITZGERALD.